April 21, 1959  A. SURINO  2,882,967
DIGESTING APPARATUS DISCHARGE VALVE ASSEMBLY
Filed Oct. 6, 1954  3 Sheets-Sheet 1
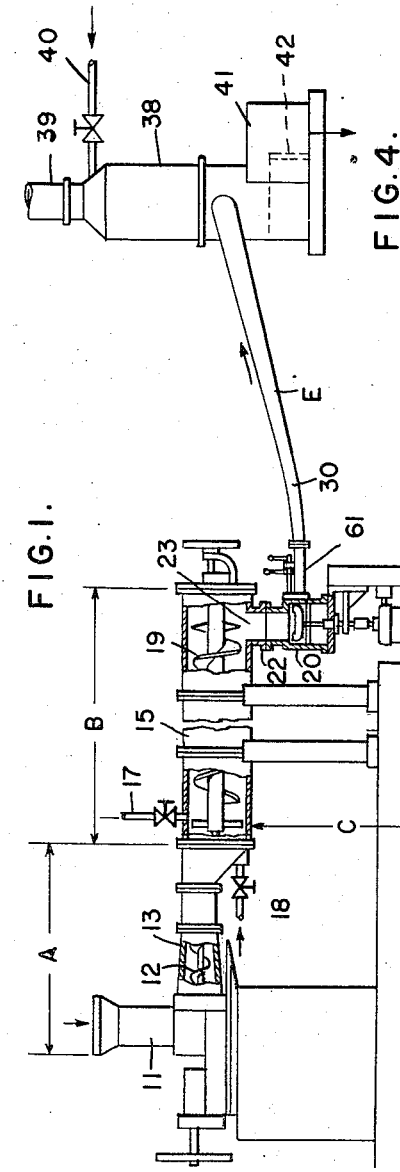
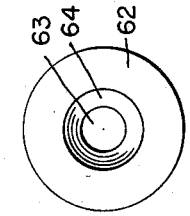
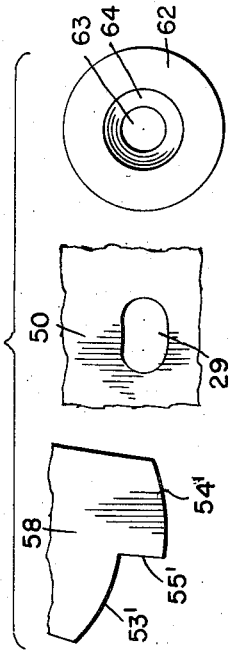
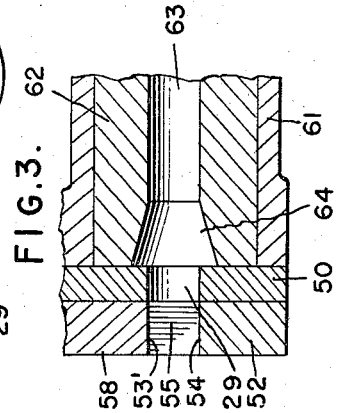
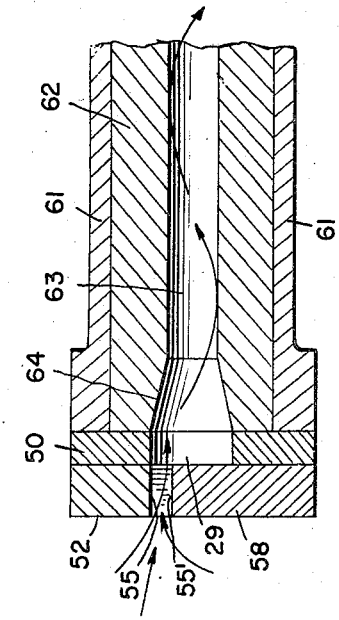
INVENTOR
Alphonse Surino
BY Arthur Middleton
ATTORNEY April 21, 1959        A. SURINO        2,882,967
DIGESTING APPARATUS DISCHARGE VALVE ASSEMBLY
Filed Oct. 6, 1954        3 Sheets-Sheet 2
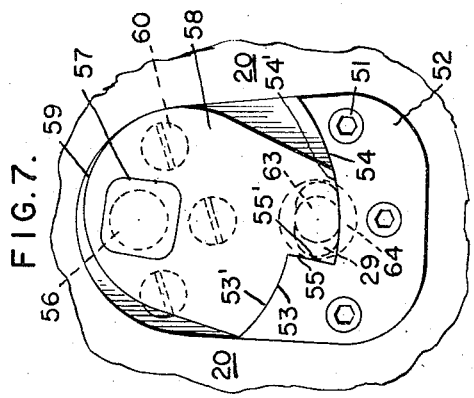
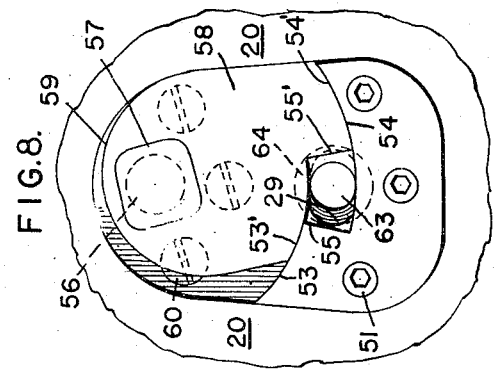
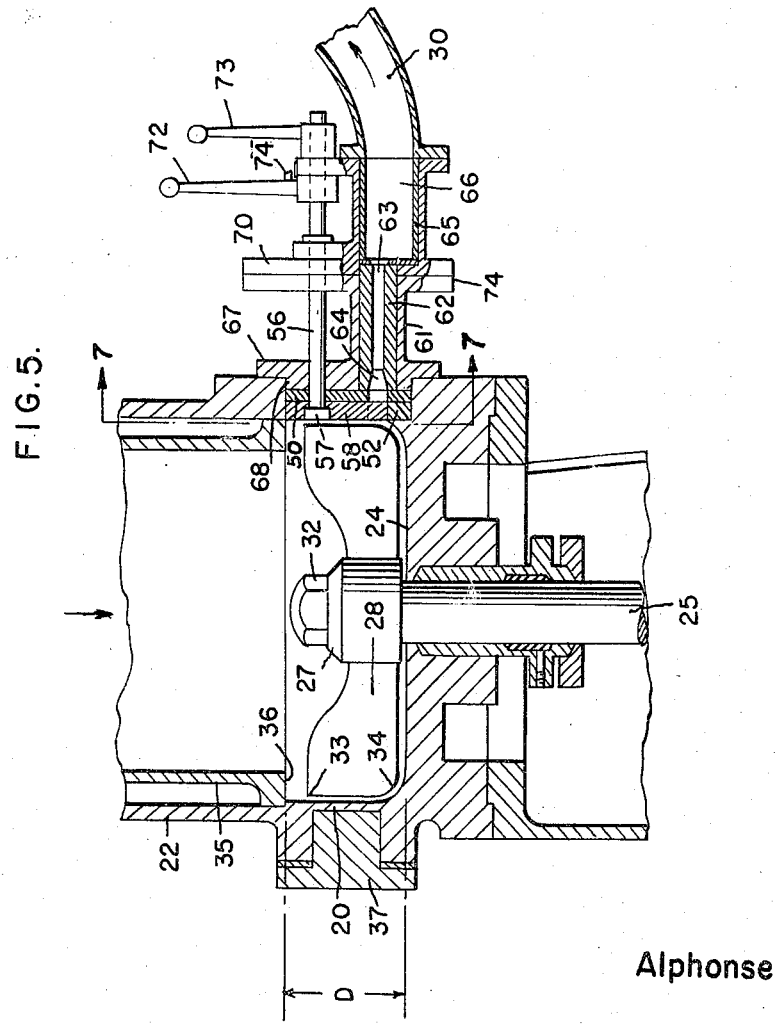
INVENTOR
Alphonse Surino
BY
ATTORNEY April 21, 1959  A. SURINO  2,882,967
DIGESTING APPARATUS DISCHARGE VALVE ASSEMBLY
Filed Oct. 6, 1954  3 Sheets-Sheet 3
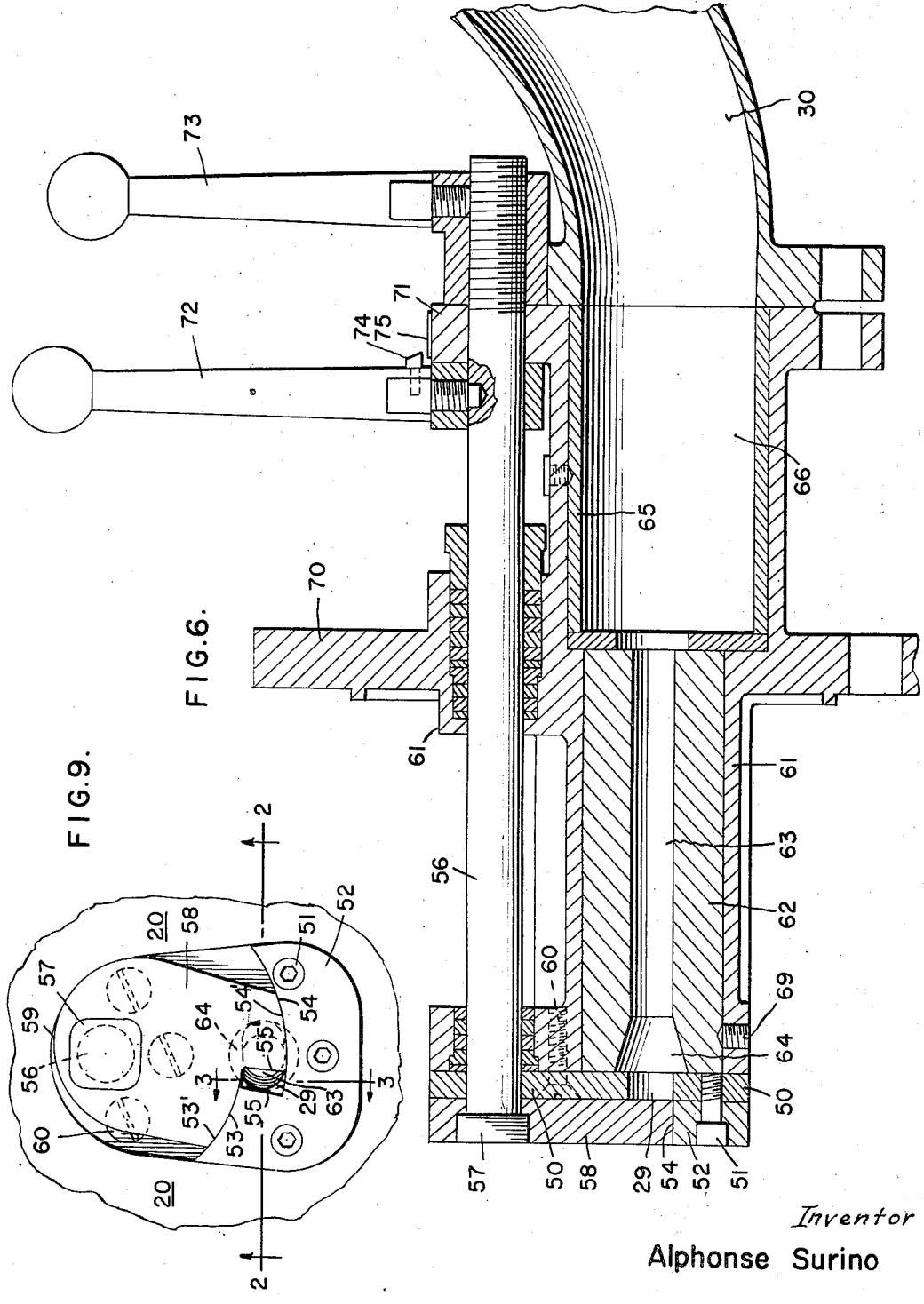
Inventor
Alphonse Surino
By Arthur Middleton
ATTY.

United States Patent Office 2,882,967
Patented Apr. 21, 1959

2,882,967

DIGESTING APPARATUS DISCHARGE VALVE ASSEMBLY

Alphonse Surino, Babylon, N.Y., assignor to Pandia Inc., New York, N.Y., a corporation of New York Application October 6, 1954, Serial No. 460,691

6 Claims. (Cl. 162—246)

This invention relates to the preparation of cellulosic starting material, such as wood chips, for conditioning them preparatory to rendering them suitable for paper-making or for hard-board making. More particularly this invention comprises an improvement on the fiberizing machine shown and described in the patent to Kehoe et al., No. 2,616,802 of November 4, 1952.

The Kehoe et al. patent relates generally to continuous digesting apparatus for cellulosic materials and especially to apparatus for effecting continuous discharge of digested fibrous material from a continuous cooking vessel while maintaining the desired temperature and steam pressure conditions within the cooking vessel.

This discharge apparatus includes a chamber which continuously receives the cooked material under the same temperature and pressure conditions prevailing in the main cooking vessel, and this chamber has a discharge orifice through its wall. A driven bladed impeller operates to maintain this orifice free of fibrous material which might otherwise tend to clog it, and the fibrous material is accordingly forced continuously through the orifice in a small stream by the steam pressure within the chamber under conditions which tend to fragmentize the fibrous particles.

The control of the effective size of the discharge orifice from the discharge chamber as described above is of major importance in obtaining optimum results, and the same is also true of the path of the continuous stream of particles and steam issuing from the orifice, especially that portion of the path closely adjacent the discharge side of the orifice. In particular, it appears that optimum results are obtained from the standpoint of efficient discharge and minimum loss of steam if the escaping stream is forced to follow a zig-zag pattern as distinguished from a comparatively straight flow path.

It is a primary object of the present invention to provide a discharge valve mechanism for continuous digesting apparatus of the above general characteristics which will fulfill the above requirements, and particularly which will promote maximum efficiency of operation of the digesting apparatus with which it is associated.

It is also an object of the invention to provide such a discharge valve mechanism which is constructed for ready replacement to maintain proper operating efficiency for the valve mechanism as well as to minimize servicing requirements.

Additional objects and advantages of the invention will be apparent from the following description, the accompanying drawings and the appended claims.

In the drawings:

Fig. 1 is a side elevational view, partly broken away, illustrating continuous digesting apparatus constructed in accordance with the above Kehoe et al. patent and also embodying the discharge valve mechanism of the present invention;

Fig. 2 is an enlarged fragmentary section through the discharge valve mechanism of Fig. 1, the view being taken as indicated by the line 2—2 of Fig. 9;

Fig. 3 is a view similar to Fig. 2 but at right angles thereto as indicated by the line 3—3 of Fig. 9;

Fig. 4 is an exploded fragmentary view of certain of the component parts of the valve mechanism of Figs. 2 and 3 looking from left to right in Figs. 2 and 3;

Fig. 5 is an enlarged fragmentary view in vertical section showing the discharge chamber and discharge valve mechanism of Fig. 1;

Fig. 6 is an enlarged sectional view similar to Fig. 5 but showing only the discharge valve mechanism;

Fig. 7 is an enlarged fragmentary view looking towards the discharge valve mechanism from the interior of the discharge chamber of Fig. 5 as indicated by the line 7—7 of Fig. 5 and with the valve in closed position; and Figs. 8 and 9 are views similar to Fig. 7 showing the valve in fully open position and partially open position respectively.

Referring to Figures 1 and 5, the apparatus has a feeding-in zone A and an intermediate or cooking zone B from which depends a discharge zone C including an orifice-bearing closed-end terminal zone D for receiving a mobilized suspension of fragmentized fibre bundles from the cooking zone, and this suspension is conducted from the zone D by a conduit E to a cyclone 38. More particularly, the feeding-in zone A comprises a feed hopper 11 for the wood-chips (about the size of a silver dollar) or other forms of ligno-cellulose which conducts it to a screw feeder 12 rotatably driven in tapered neck-like casing 13 wherein the screw-feeder 12 forms the chips into a compacted plug formation sufficiently dense to prevent heat and pressure loss from pipe or conduit 15 of the intermediate zone B. Conduit 15 (which can be as large as 3 ft. in diameter) has the plug formation fed thereto eccentrically through feed opening 16, and the conduit is horizontally placed or at least sufficiently horizontal to support the material being treated therein.

Saturated steam is supplied to the conduit 15 through valved injector pipe 17 for maintaining a regulated super-atmospheric pressure and temperature in both the intermediate zone B and the discharge zone C for softening the ligneous fibre-binding incrustants. Into those zones may also be supplied a chemical through valved injection pipe 18 for use in rendering the ligneous binding material water-soluble, or for other purposes. The conduit 15 is much larger in diameter than the plug formed in the neck-like casing 13 so that the fibrous particles are free to expand under the influence of the moist heat in the conduit 15.

A screw conveyor 19, suitably rotated, is provided in the conduit 15 for the purpose of controlling carefully the rate of progress and the time of transit of the chips through and along the conduit 15 as well as the total time of their transit therethrough under conditions that there is no localized over-treatment or degradation of the cellulosic fibres. Connected toward one end of the conduit 15 is a down-pipe 22 down which wood-chips from the conduit 15 freely fall through opening 23. The down-pipe merges into an impeller compartment which is closed off at its bottom by closure wall or bottom 24 through which extends a shaft 25 driven by motor 26. On the upper end of the shaft 25 is an impeller 27 having blades 28. In the horizontal plane of the impeller 27 there is at least one discharge outlet orifice or port 29 opening into a discharge conduit 30 which leads the pulp to further treatment. The effective size of the discharge orifice 29 is controlled, such as by apparatus shown in Figures 5 and 8, and the clearance between the blades 28 of the impeller 27 and the encasing walls is critical and so is the diameter of the discharge orifice.

Referring now to Figure 5, the impeller 27 is held in place on shaft 25 by nut or hub 32, and each blade 28 is preferably set non-radially to the hub 32 to provide pumping action and also is preferably shaped so that the pumping free end thereof is somewhat taller than the inner end thereof. The lower outer edge 34 is curved to correspond with the closure bottom 24 beneath the impeller, because it is important that the clearance between this and the blades be minimized while the clearance between the blade ends 33 and their encasing wall 20 must be a critical distance. Just above the top of the blades 28, the effective diameter of the down-pipe 22 is smaller than the diameter of the wall 20 encircling the impeller 27.

One manner of accomplishing this relative relationship of smaller effective diameter of feed delivery pipe to larger diameter of impeller is by the interposition axially of the sleeve 35 in the down-pipe 22, so that the lower terminus of the sleeve forms an annular baffle or shoulder 36 above the outer extremities of the blades 28. The annular shoulder 36 and the bottom closure wall 24 forms with the wall 20 a casing for the impeller which comprises an annular space or zone D wherein there is a flattened vortex-shaped concentration of the chip fragments being batted around by the ends 33 of the blades 28 and reflected or deflected between the vortex flattening or limiting shoulder 36 and adjacent parts of the encasement adjacent the impeller. The reference character 37 represents a removable hand-hole plate.

The taller ends 33 of the blades tend to cause the fragments to rise, swirl or roil upwardly against the shoulder 36 which results in a strong deflective action downwardly being imposed on them. Meanwhile, the high rate of rotation of the blades rotates or whirls the mobilized suspension so rapidly that centrifugal impulses are imposed on the fragments sufficient in addition to the flow velocity of the stream of steam in which they are to impel them through the size-controlling discharge orifice 29.

The discharge orifice 29 discharges treated pulp into an emission conduit 30 of progressivley increasing cross-section which conducts the pulp to a cyclone 38 having a gas-escape stack 39 and a water-spray 40 for thoroughly mixing the treated pulp in a water bath in a usual stock-chest 41. This bath may be heated by steam or otherwise, to control its temperature, as desired. A water suspension of the pulp overflows a usual weir 42 to pass for further treatment.

Since the effective size of the orifice 29 is critical, one example of means for varying its size is as follows: referring to Figs. 2, 3, 4 and 6 it will be noted that the discharge orifice 29 is elliptical in shape and is formed in a fixed plate member 50 secured to the lower front portion of which, by suitable bolts 51, is a fixed bottom plate 52, having its upper edge made into two interrupted curved portions 53 and 54 separated by a straight line face 55. A rockshaft 56 extends through the fixed orifice plate 50 and includes a squared head 57 for securing a shutter 58 thereon for rocking movement therewith. The shutter 58 has its lower edge reversely curved at 53', 54' and 55' to correspond complementally to the edges 53, 54 and 55 of the fixed plate member 50 with respect to which the shutter 58 rocks. The upper part of the rockable shutter 58 is curved at 59 to allow space for the rocking motion of the shutter.

The orifice plate 50 is mounted by screws 60 on the inner end of the part 61 which forms the valve body of the discharge valve mechanism and holds within it an inner replaceable sleeve element 62, having a bore 63 therethrough provided with a tapered or funnel-like entrance 64. This inner sleeve leads to an outer replaceable sleeve 65, whose bore 66 is larger in diameter than the bore 63 of the sleeve 62 and leads to the emission conduit 30, or E, leading to the cyclone 38. A flange 67 on the valved body 61 provides for mounting this valve assembly on the wall 20, and the inner end of the body 61 includes a cylindrical portion 68 which sets within a receiving bore in the wall 20. Releasable means such as the set screw 69 hold the replaceable inner sleeve 62 within the valve body 61.

As shown in Figs. 7–9 and as described in more detail hereinafter, the shutter 58 controls the effective size of the discharge orifice 29 and is movable between the fully closed position shown in Fig. 7 and the fully open position shown in Fig. 8. These movements of the shutter 58 are effected through movement of the rockshaft 56, which is rotatably supported in flanges 70 and 71 on the part 61, and an operating handle 72 is secured to the rockshaft 56 as shown in Fig. 6. An additional handle 73 is threaded on the outer end of the rockshaft 56 to act as a lock nut in cooperation with the flange 71 for securing shaft 56 in adjusted position. A pointer 74 on the handle 72 cooperates with a scale 75 on flange 71 to indicate the extent of the effective opening of the orifice 29 in each adjusted position of the shutter 58.

Operations

The wood-chips are supplied to the feeding-in zone A of the digester, wherein the screw-feeder 12 forces the chips into the intermediate zone B of the digester under conditions which prevent any substantial loss of steam therefrom. Saturated steam is supplied through steam-injection pipe 17 while chemicals may (or may not) be added through chemical injection pipe 18. The digester is maintained by the supplied steam at a temperature above the softening point of the ligneous binding material. The screw conveyor 19 in the intermediate zone B defined by the horizontal or at least material-supporting pipe 15 has as its purpose the determination of the rate of progression of the chips therealong whereby the time of transit of the chips through the digester is under the control of the operator. The quantity of wood-chips fed is correlated to cross-sectional area of the horizontal pipe 15 (or vice versa) so that the chips never fill that area but space is left for the particles to expand due to the heat, pressure and moisure conditions of that pipe.

The discharge zone C of the digester is defined by a vertical pipe 22 through which chips freely fall from the screw conveyor 19. In so falling, the chips encounter in the closed-end terminal zone D what may be termed a cushion of a mobilized, fluidized, whirling, suspension of chip fragments, shives and fiber-bundles. This suspension is generally annular in shape due to the intense agitation and turbulence generated in the zone by means such as the impeller 27 with its blades 28.

The suspension then is impelled out through orifices 29, partly due to the stream of steam flowing therethrough. The diameter of this orifice is important because it seems to limit or control the maximum size of the fragment or fiber-bundles thereof which can be emitted threadingly through that orifice. To aid in the control of the maximum particle-size in the emitted suspension, the diameter of the orifice desired is under the control of the operator, by means of the handle or lever 72 for turning rotatable shaft 56. From the orifice the discharged gas-suspended wood-fibers are carried by the moving gas into the cyclone 38. The separation of the fiber-bundles into individual fibers is believed to be due to their forced passage threadingly through the orifice and to their impingement against the walls of the discharge pipe 30.

The invention provides special means for assuring that the stream of steam escaping or discharging through the orifice 29 shall carry its full burden of wood fragments through that orifice into the receiving conduit whereby there is minimized the escape through the orifice of steam alone, or substantially alone. The orifice 29 itself in fixed plate member 50 is elongated and somewhat ovoid in shape as can be seen in Fig. 4. Its effective opening is controlled by the rockable shutter 58 in front of it, whose straight face or edge 55' is movable back and forth across the face of the orifice between the fully closed position in Fig. 7 and fully open position in Fig. 6.

In usual operation, the shutter 58 is in partially open position, and the effective opening of the orifice 29, somewhat as shown in Fig. 9, is rarely less than .15 sq. in. The orifice itself is ¾" wide and 1¼" long, so its wide open area is approximately .82 sq. in. Therefore it can be operated with any effective opening between .15 and approximately .82 sq. in., but .15 sq. in. seems to be the optimum, because the smaller the opening used, the less is the steam consumption per ton of pulp discharged. The bore 63 of inner sleeve 62, into which steam is received as it escapes through the orifice 29, has a diameter of not in excess of 1 in. which means it has a cross-sectional open area of .75 sq. in. And the minimum diameter seems to be ¾ in., otherwise plugging results. Otherwise, the ideal relationship seems to be that the bore 63 should have an opening about three times the effective orifice opening used. The most satisfactory relationship, as shown by tests, is that the orifice should be open to the extent of .15 sq. in. while the bore is .45 sq. in. Since the maximum opening of the orifice 29 is approximately .82 sq. in. the tapered or funnel-like entrance 64 to the bore 63 must be as large at its entrance as is the maximum opening of the orifice, because there should be no step or obstruction between the bore 63 in the sleeve and the orifice 29. The preferred angle of the bevel is about 15° from the horizontal. The bore 63 in the inner sleeve 62 discharges into an outer sleeve 65 whose bore should be at least twice as large in diameter as the bore 63 of the inner sleeve. The outer sleeve is not essential but desirable to take up wear, whereupon it can be easier replaced. The length of the inner sleeve 64 should be in a range of from 4 inches to 10 inches.

So looking at Fig. 2, which is taken along the line 2—2 in Fig. 9, it can be seen that the rockable shutter 58, through its operating handle 72 (secured in adjusted position by handle 73) causes its edge 55' to cover up the orifice 29 to the extent shown, to provide a restricted entrance thereto by the fixed edge 55 and the moveable edge 55'. And this restricted entrance fixes the effective open area of the orifice 29. So into and through this restricted entrance flows the stream of steam, as shown by the arrows in Fig. 2, with its burden of fragments drawn from the mobilized mass thereof within the vertical pipe 22 of the digester.

It is to be noted that the stream of steam with its burden of wood fragments enters the bore 63 of inner sleeve 62 in a non-aligned manner, as is well shown in Fig. 2. So the steam instead of passing axially through the bore of the sleeve first encounters with considerable force, or impinges upon, the bevelled wall 64 from which the stream of steam is reflected as shown by the arrow. This causes the steam to be reflected to the opposite side of the bore 63, and this in turn causes further reflection or bounce to another side of the bore. And it is this reflection or bouncing of the stream of steam that is such an important function of this invention. This controlled bounding and re-bounding of the steam prevents the quick escape of the steam without carrying its full burden of fragments or fibers. Care has to be taken not to have such turbulence of the stream of steam as to set up disadvantageous back-pressure, because any significant building up of too much back-pressure will result in plugging up of the orifice. So the turbulence must not only be controlled as to quantity but it must be controlled as to kind, because irregular agitation of the steam is disadvantageous. The turbulence, even if it can be called that, is really bouncing and thus regular in its frequency. The bouncing action tends to retard the forward rate of progress of the stream of steam not enough to set up serious back-pressure but just enough to make the stream of steam carry its full load of fibers with it as it passes through the orifice into the sleeve. In connection with the bouncing, an unexpected phenomenon has been observed, namely, that the bounces seem to take place in the same spots, for at those spots the metal of the sleeve wears or washes away. And this is the reason why it is desirable to have the inner sleeve 62 readily replaceable. The first bounce seems to take place closely about 3 inches from the shutter plate 58 which determines the minimum length of the sleeve.

Therefore, this invention solves its problem by the apparatus illustrated but it is important that the apparatus be so designed and proportioned that not only is the stream of steam caused to carry its full burden of wood fibers, but the back-pressure exerted by the bouncing is enough to accomplish its purpose without exerting plugging back-pressure on the orifice or on the bore of the sleeve.

I claim:

1. A discharge valve assembly for use in conjunction with continuous digesting apparatus of the character described for cellulosic material including a steam pressure chamber for treating the material and a discharge chamber connected to receive a suspension of digested cellulosic material and steam from the pressure chamber and having an outlet opening in the wall thereof, comprising a valve body adapted to be mounted on the outer wall of said discharge chamber in covering relation with said outlet opening, means within said valve body defining a cylindrical discharge passage for conducting said suspension through said body from said opening, means on said valve body defining a discharge orifice connecting said opening with said passage and having a flow area substantially smaller than that of said passage, and means locating said orifice entirely in directly overlying relation with the inner end of said passage to cause said suspension passing through said orifice to enter said passage directly and to be reflected from the wall of said passage in passing therethrough.

2. A discharge valve assembly for use in conjunction with continuous digesting apparatus of the character described for cellulosic material including a steam pressure chamber for treating the material and a discharge chamber connected to receive a suspension of digested cellulosic material and steam from the pressure chamber and having an outlet opening in the wall thereof, comprising a valve body adapted to be mounted on the outer wall of said discharge chamber in covering relation with said outlet opening, a sleeve received within said body and having a central bore forming a discharge passage for conducting said suspension through said body from said opening, means on said body defining a discharge orifice overlying the inner end of said bore, means cooperating with said orifice-defining means to cause said suspension passing through said orifice to enter said bore at an angle to the axis thereof and thereby to be reflected through the wall of said bore in passing therethrough, and releasable means securing said sleeve within said body to provide for ready removal and replacement thereof.

3. A discharge valve assembly for use in conjunction with continuous digesting apparatus of the character described for cellulosic material including a steam pressure chamber for treating the material and a discharge chamber connected to receive a suspension of digested cellulosic material and steam from the pressure chamber and having an outlet opening in the wall thereof, comprising a valve body adapted to be mounted on the outer wall of said discharge chamber in covering relation with said outlet opening, means within said valve body defining a cylindrical discharge passage for conducting said suspension through said body from said opening, means on said valve body defining a discharge orifice overlying the inner end of said passage, and means cooperating with said orifice-defining means to establish a size and spatial relationship between said orifice and said passage wherein said passage has approximately three times the maximum effective flow area of said orifice and wherein said suspension passing through said orifice enters said passage eccentrically of the central axis thereof with resulting tendency to be reflected from the wall of said passage in passing therethrough.

4. A discharge valve assembly for use in conjunction with continuous digesting apparatus of the character described for cellulosic material including a steam pressure chamber for treating the material and a discharge chamber connected to receive a suspension of digested cellulosic material and steam from the pressure chamber and having an outlet opening in the wall thereof, comprising a valve body adapted to be mounted on the outer wall of said discharge chamber in covering relation with said outlet opening, means within said body defining a passage of cylindrical cross-section for conducting said suspension through said body from said opening, means on said body defining a discharge orifice centrally aligned with said passage and of elongated configuration with the longer dimension thereof not greater than the diameter of the adjacent end of the said passage and with the shorter dimension thereof substantially shorter than said diameter, and a movable control member arranged for cooperation with said orifice to effect progressive opening thereof in the direction of said longer dimension thereof and thereby to cause said suspension in all partly opened positions of said orifice to enter said passage eccentrically of the axis thereof with resulting tendency to be reflected from the wall of said passage in passing therethrough.

5. A discharge valve assembly for use in conjunction with continuous digesting apparatus of the character described for cellulosic material including a steam pressure chamber for treating the material and a discharge chamber connected to receive a suspension of digested cellulosic material and steam from the pressure chamber and having an outlet opening in the wall thereof, comprising a valve body adapted to be mounted on the outer wall of said discharge chamber in covering relation with said outlet opening, a sleeve received within said body and having a central bore defining a passage for conducting said suspension through said body from said opening, a plate mounted on the inner end of said body in overlying relation with said sleeve and having a discharge orifice therethrough aligned with said bore of said sleeve and having a flow area less than that of said bore, a movable control member mounted for movement with respect to said plate to effect progressive opening of said orifice and thereby to cause said suspension in all partly opened positions of said orifice to enter said bore eccentrically of the axis thereof with resulting tendency to be reflected from the wall of said bore in passing therethrough, and means removably securing said sleeve and said plate to said body for ready selective removal and replacement thereof.

6. A discharge valve assembly for use in conjunction with continuous digesting apparatus of the character described for cellulosic material including a steam pressure chamber for treating the material and a discharge chamber connected to receive a suspension of digested cellulosic material and steam from the pressure chamber and having an outlet opening in the wall thereof, comprising a valve body adapted to be mounted on the outer wall of said discharge chamber in covering relation with said outlet opening, a sleeve received within said body and having a central bore forming a discharge passage for conducting said suspension through said body from said opening, means on said body defining a discharge orifice overlying the inner end of said bore and having a flow area less than said end of said bore, and said bore including a tapered portion adjacent said orifice and converging in the direction of flow therethrough from said orifice to cause said suspension passing through said orifice to impinge on said tapered portion and thereby to enter the remainder of said bore at an angle to the axis thereof with resulting tendency to be reflected from the wall of said bore in passing therethrough.

References Cited in the file of this patent

UNITED STATES PATENTS

| | | |
|---|---|---|
| 1,493,121 | McAneny | May 6, 1924 |
| 1,578,609 | Mason | Mar. 30, 1926 |
| 1,655,618 | Mason | Jan. 10, 1928 |
| 1,734,723 | Gildehaus | Nov. 5, 1929 |
| 1,824,221 | Mason | Sept. 22, 1931 |
| 1,922,313 | Mason | Aug. 15, 1933 |
| 1,991,245 | De La Roza | Feb. 12, 1935 |
| 2,159,258 | De La Roza | May 23, 1939 |
| 2,616,802 | Kehoe et al. | Nov. 4, 1952 |

FOREIGN PATENTS

| | | |
|---|---|---|
| 459,231 | Canada | Aug. 30, 1949 |